United States Patent

Shikano

Patent Number: 5,211,442
Date of Patent: May 18, 1993

[54] CURTAIN INSTALLATION STRUCTURE

[75] Inventor: Tsuyoshi Shikano, Gifu, Japan

[73] Assignee: Ikeda Bussan Co., Ltd., Ayase, Japan

[21] Appl. No.: 797,941

[22] Filed: Nov. 26, 1991

[30] Foreign Application Priority Data

Nov. 26, 1990 [JP] Japan ............................. 2-124398[U]

[51] Int. Cl.⁵ ............................................. B62D 25/06
[52] U.S. Cl. ....................................... 296/138; 160/32; 160/35; 160/370.2
[58] Field of Search ................ 160/32, 35, 330, 370.2, 160/349.1, 349.2; 296/83, 97.8, 138

[56] References Cited

U.S. PATENT DOCUMENTS 1,822,729  9/1931  Fairhurst .......................... 160/35 X Primary Examiner—Blair M. Johnson
Attorney, Agent, or Firm—Foley & Lardner

[57] ABSTRACT

A curtain installation structure for a vehicle is comprised of a garnish which is installed to cover a pillar of the vehicle. The garnish defines a curtain receiving section at a side end portion of a window. A cover member is hingedly connected to the garnish to close the curtain receiving section. A curtain of the window is slidably connected to a curtain rail which is attached to an upper side of the window and whose end portion extends near the garnish. When the curtain is not in use, it is received in the curtain receiving section under a folded condition, and the curtain receiving section is closed by the cover member.

6 Claims, 2 Drawing Sheets

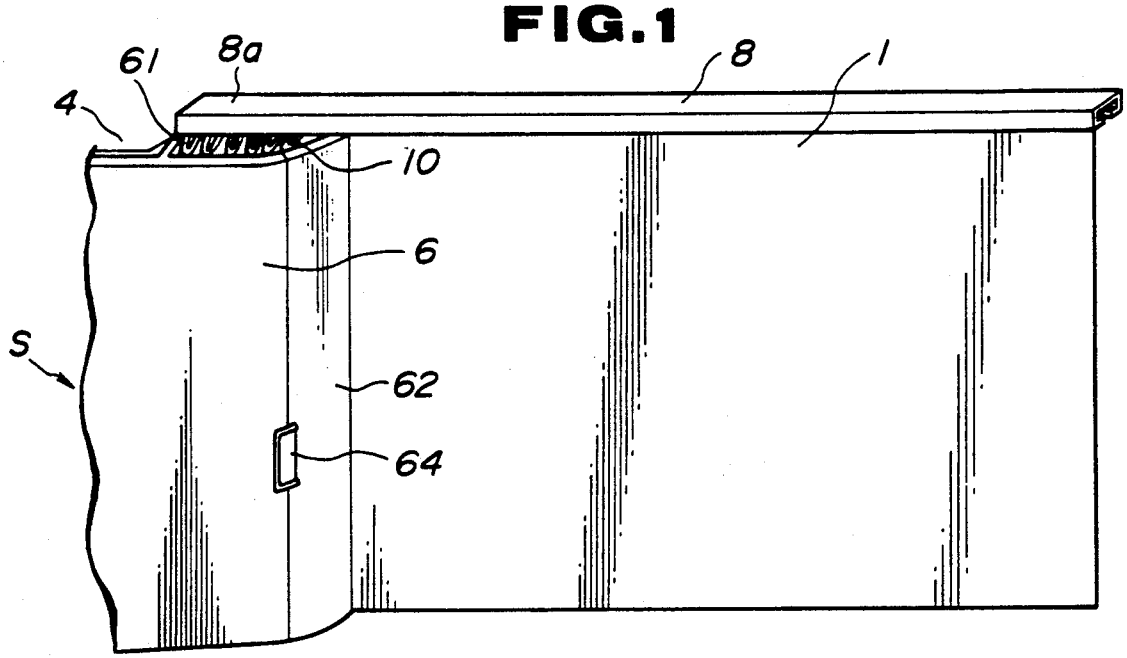
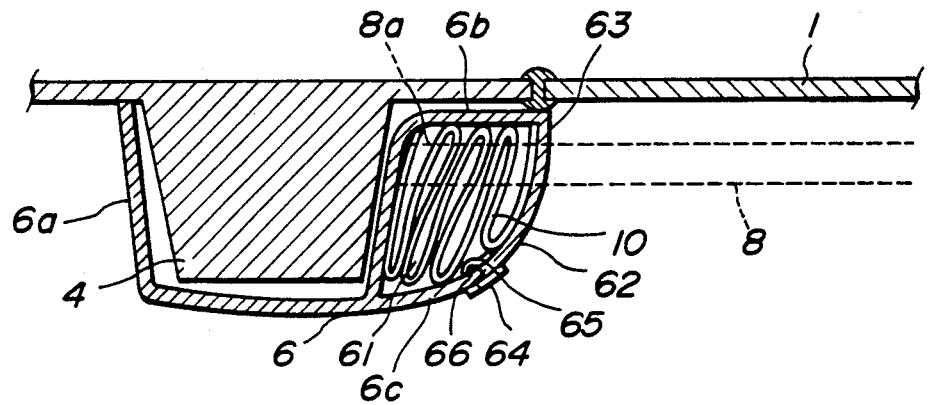
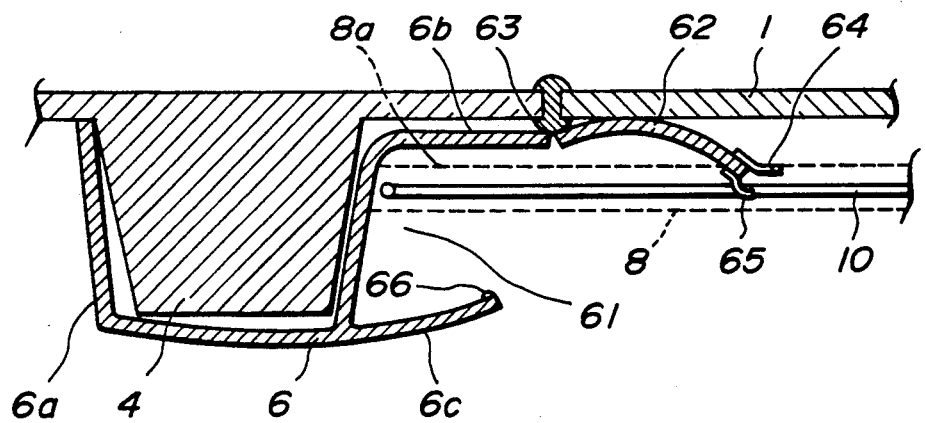

5,211,442

CURTAIN INSTALLATION STRUCTURE

BACKGROUND OF THE INVENTION

1. Field of the Invention

The present invention relates to improvements in an curtain installation structure, and more particularly to a curtain installation structure which is used for curtains of vehicles.

2. Description of the Prior Art

Hitherto, curtains of automotive vehicles are slidably attached to the upper portion of side and rear windows through guide rails. When the curtains of automotive vehicles are not in use, they are folded and fixed by belts at side end portions of the windows. Such an installation structure of the curtains is shown in FIG. 5, in which a first pillar 104 is disposed between a first side window 101 and a second side window 103. A second pillar 105 is disposed at a corner portion between the first window 101 and a second window 102. The pillars 104 and 105 are covered with pillar garnishes 106 and 107, respectively. A curtain rail 108 is installed to an upper peripheral portion of the first side window 101 to slidably support curtains 110 and 111. Similarly, a curtain rail 109 is installed to an upper peripheral portion of the second window 102 to slidably support a curtain 112.

However, since the curtains 110, 111 and 112 are folded and fixed by belts 113, 114 and 115, respectively when it is not in use, the curtains 110, 111 and 112 are exposed in the vehicle compartment. This degrades a visibility for driving the vehicle and an external appearance of the vehicle compartment.

SUMMARY OF THE INVENTION

It is an object of the present invention to provide an improved curtain installation structure for curtains of vehicles, which is free of the above-mentioned drawbacks.

A curtain installation structure applied to a curtain for a window of a vehicle, in accordance with the present invention, comprises a garnish which defines a curtain receiving section in which a curtain for the window is received in a folded condition. A cover member is hingedly connected at one side thereof with the garnish. The cover member is contactable at the other side with the garnish so as to cover the curtain receiving section.

With this arrangement, the vehicle is improved in the external appearance of the passenger compartment and in the visibility for drivers.

BRIEF DESCRIPTION OF THE DRAWINGS

FIG. 1 is a perspective view of a first embodiment of a curtain installation structure which is applied to a rear side window, in accordance with the present invention;

FIG. 2 is a cross-sectional view of the curtain installation structure of FIG. 1, which is in a curtain receiving condition;

FIG. 3 is a cross-sectional view of the curtain installation structure similar to FIG. 3, but in a curtain using condition;

DETAILED DESCRIPTION OF THE INVENTION

Figure 4:
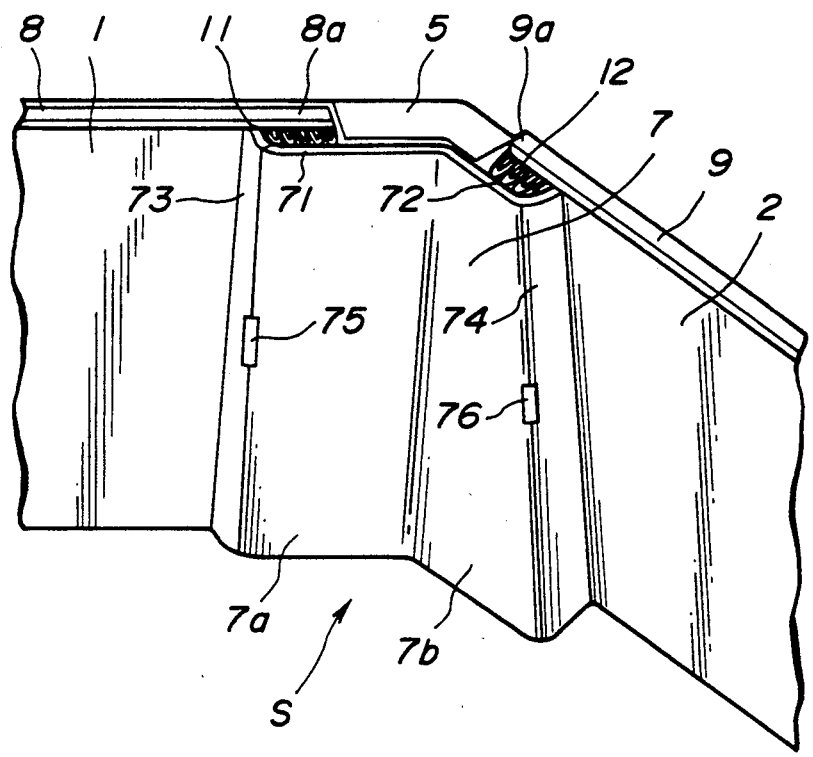
FIG. 4 is a perspective view of a second embodiment of a curtain structure in accordance with the present invention.
Figure 5:
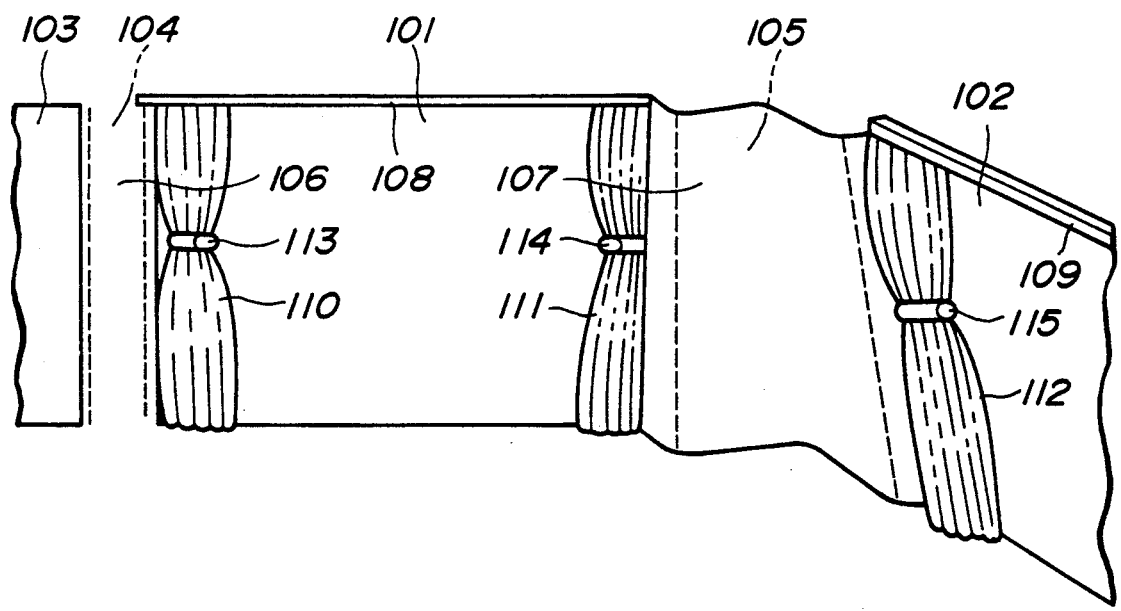
FIG. 5 is a perspective view of a conventional curtain installation structure.

Referring now to FIGS. 1 to 3, there is shown a first embodiment of a curtain installation structure S in accordance with the present invention.

The curtain installation structure S comprises a garnish 6 which is formed of first, second and third parts 6a, 6b and 6c of a sheet shape. The garnish 6 is made of a plastic material such as polypropylene or polyvinyl chloride. Each one side of the first, second and third parts 6a, 6b and 6c is connected with each other to be formed in a generally Y-shape in cross-section as shown in FIG. 3. The first and second parts 6a and 6b cover and connected to a side pillar 4 which is disposed between a side window 1 and a front side window (not shown) of an automotive vehicle. A curtain receiving section 61 is defined by the second part 6b and the third part 6c of the garnish 6 so that a curtain 10 is received thereinside. A cover member 62 is hingedly connected at its first side portion with the peripheral end portion of the second part 6b through a hinge 63 secured to the side window 1. A lever 64 through which the cover member 62 is opened and closed, is connected at an outer surface of a second side portion of the cover member 62. A hook 65 is connected to an inner surface of the second portion of the cover member 62. A projection 66 is connected to an end portion of the third part 6c. The hook 65 and the projection 66 are arranged so that the cover member 62 is connected with the third part 6c of the garnish 6 so as to define the curtain receiving section 61. A curtain rail 8 is installed to an upper portion of the side window 1. The curtain 10 for covering the side window 1 is slidably connected to the curtain rail 8.

With the thus arranged curtain installation structure S, the curtain 10 is folded at an end portion 81 of the curtain rail 8 and received in the curtain receiving section 61 when it is not in use. The curtain receiving section 61 is covered with the cover member 62, and a hook 65 is connected with the projection 66. When the curtain 10 is in use, the cover member 62 is opened and the curtain 10 is extended to cover the side window 1 as shown in FIG. 2.

Referring to FIG. 4, there is shown a second embodiment of the curtain installation structure S in accordance with the present invention, where a basic structure for the curtain receiving section is similar to the first embodiment of the present invention except that the curtain installation structure S of the second embodiment is applied to a corner pillar 5 and is for two curtains 11 and 12.

The curtain installation structure S for an automotive vehicle is installed to the corner pillar 5 which is disposed between the side window 1 and a rear window 2. The curtain installation structure S comprises a garnish 7 with which the corner pillar 5 is covered. The garnish 7 has first and second parts 7a and 7b which are disposed generally parallel to the windows 1 and 2, respectively while having a predetermined distance between the windows 1 and 2, respectively. A side portion of a cover member 73 is hingedly connected on the side window 1 through a hinge (not shown) and the other side portion of the cover member 73 is contactable with the peripheral side of the first part 7a. The cover member 73 and the first part 7a defines a first curtain receiving portion 71 where the curtain 11 is received in a folded condition. A lever 75 through which the cover member 73 is opened and closed, is connected at an outer surface of the cover member 73. On the other hand, a side of a cover member 74 is hingedly connected on the rear window 2 through a hinge (not shown) and the other side of the cover member 74 is contactable with the free side portion of the first part 7b. The cover member 74 and the first part 7b defines a second curtain receiving portion 72 where the curtain 12 is received in a folded condition. A lever 76 through which the cover member 74 is opened and closed, is connected at an outer surface of the cover member 74. A curtain rail 8 is installed to an upper peripheral portion of the side window 1 and its one end portion 8a extends to a portion close to the garnish 5. Similarly, a curtain rail 9 is installed to an upper peripheral portion of the rear window 2 and its one end portion 9a extends to a portion close to the garnish 5. A rear curtain 11 is slidably supported to the curtain rail 8 so as to cover the side window 1, and a back curtain 12 is slidably supported to the curtain rail 9 so as to cover the rear window 2.

What is claimed is:

1. A curtain installation in a vehicle, comprising:
    a garnish covering a pillar disposed between windows of the vehicle and defining a curtain receiving section;
    a curtain rail installed to an upper portion of the vehicle window and connected with a curtain such that the curtain is slidable along said curtain rail, said curtain rail extending to the curtain receiving section in which the curtain is received in a folded condition; and
    a cover member hingedly connected at one side thereof with said garnish, said cover member being contactable at the other side with said garnish so as to close the curtain receiving section.

2. A curtain installation structure as claimed in claim 1, further comprising a curtain rail to which the curtain is slidably attached, said curtain rail extending to a portion close to a pillar so that the curtain is received in the curtain receiving section.

3. A curtain installation structure as claimed in claim 1, further comprising a cover member connecting means which connects said garnish and said cover member to close the curtain receiving section.

4. A curtain installation structure, in a vehicle, comprising:
    a garnish having first, second and third parts, said first and second parts covering a pillar of the vehicle, and said second and third parts defining a curtain receiving section;
    a curtain rail installed to an upper portion of a vehicle window, said curtain rail extending to the curtain receiving section; and
    a cover member hingedly connected at one side thereof with said garnish, said cover member being contactable at the other side with said garnish so as to close the curtain receiving section thereby storing the curtain therein.

5. A curtain installation structure as claimed in claim 4, wherein said cover member is hingedly connected with the second part through a hinge.

6. A curtain installation structure as claimed in claim 4, wherein said cover member is provided with a lever through which said cover member is opened and closed.

* * * * *